INVENTOR.
WILLIAM J. AMBROSE
BY Arthur H. Swanson
ATTORNEY.

INVENTOR.
WILLIAM J. AMBROSE
BY Arthur H. Swanson
ATTORNEY.

TRANSMITTING APPARATUS

Filed Dec. 18, 1959

INVENTOR.
WILLIAM J. AMBROSE

BY Arthur H. Swanson

ATTORNEY.

3,050,719

TRANSMITTING APPARATUS

William J. Ambrose, Springfield, Pa., assignor to Minneapolis-Honeywell Regulator Company, Minneapolis, Minn., a corporation of Delaware Filed Dec. 18, 1959, Ser. No. 860,533
14 Claims. (Cl. 340—206)

The object of the invention is to provide a time delay apparatus in a motion transmitting system.

Another object of the present invention is to provide a time delay apparatus between a transmitter and an integrating device such as a digital counter.

While it is possible to purchase time delay apparatus such commercially available apparatus ofttime requires the use of dash pots, bi-metal and electrical components such as resistors and capacitors which components are capable of introducing considerable error into the time delay apparatus because they are subject to adverse ambient temperature changes.

To this end it is one of the objects of the present invention to provide an improved type of time delay apparatus for a measuring apparatus which apparatus is not subject to errors resulting from changes in ambinet temperature.

It is still another object of the present invention to provide a time delay apparatus that requires fewer parts than the commercially available time delay mechanisms which have been referred to supra and which because of its simplicity in this regard is therefore less subject to error.

Another more specific object of the present invention is to employ not only a time delay apparatus for a motion transmitting system that is not only less complex than the previously mentioned commercially available timing mechanism referred to supra but which is extremely accurate in that it depends on the accuracy of a synchronous clock-type motor.

A further object of the present invention is to provide a delay apparatus in which a solenoid is employed to engage a detent on the face of a driven gear of an integrator driving gear train with a detent on the face of a gear being driven by the aforementioned synchronous clock motor only after a preselected time has elapsed after the synchronous clock motor has been energized.

It is a still more specific object of the present invention to provide a delay apparatus of the aforementioned type for use with a digital counter that is employed in a pulse duration, pulse width or time impulse type of telemetering system in which the magnitude of a measured variable such as flow of a fluid passing through a conduit, is translated by a telemeter transmitter into a telemetered electric impulse signal of a predetermined time length that is proportional to the magnitude of the measured variable so that a digital counter, located at a remotely located telemetering receiver, may be activated to indicate total integrated flow.

Figure 1:
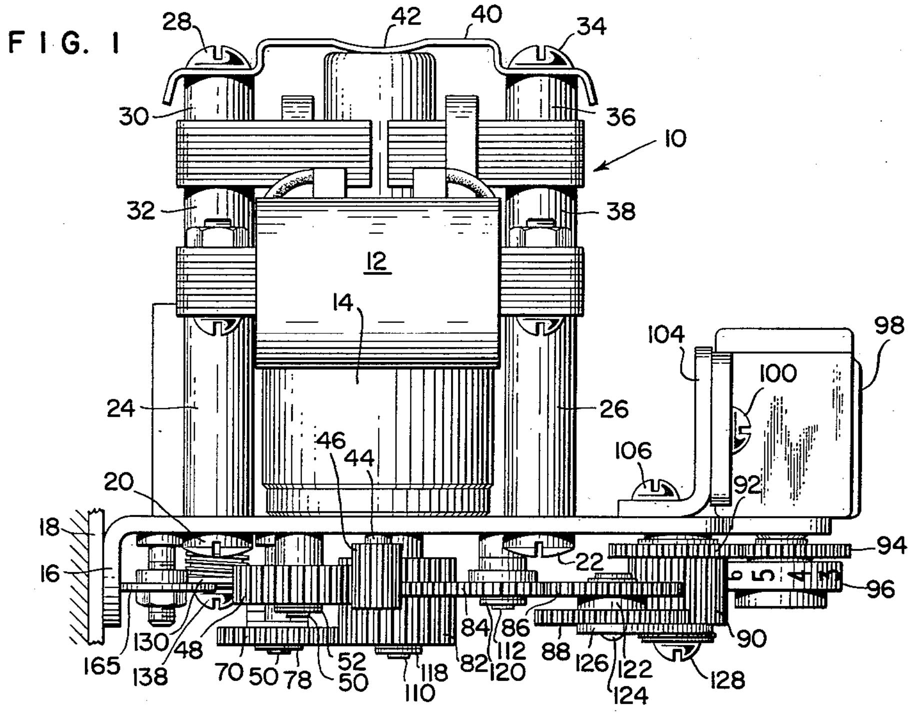
FIGURE 1 is a top plan view of the improved motion transmitting apparatus which employs a synchronous clock-driven integrator and a time delay mechanism.
Figure 2:
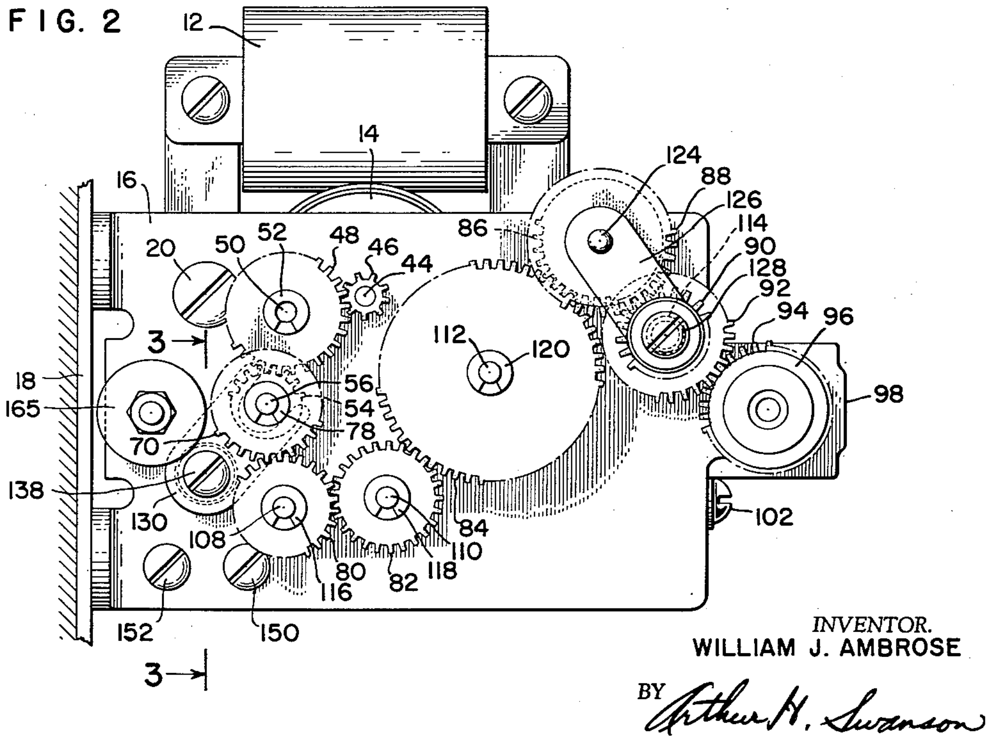
FIGURE 2 is a front elevation of the improved motion transmitting apparatus shown in FIGURE 1.
Figures 3, 4:
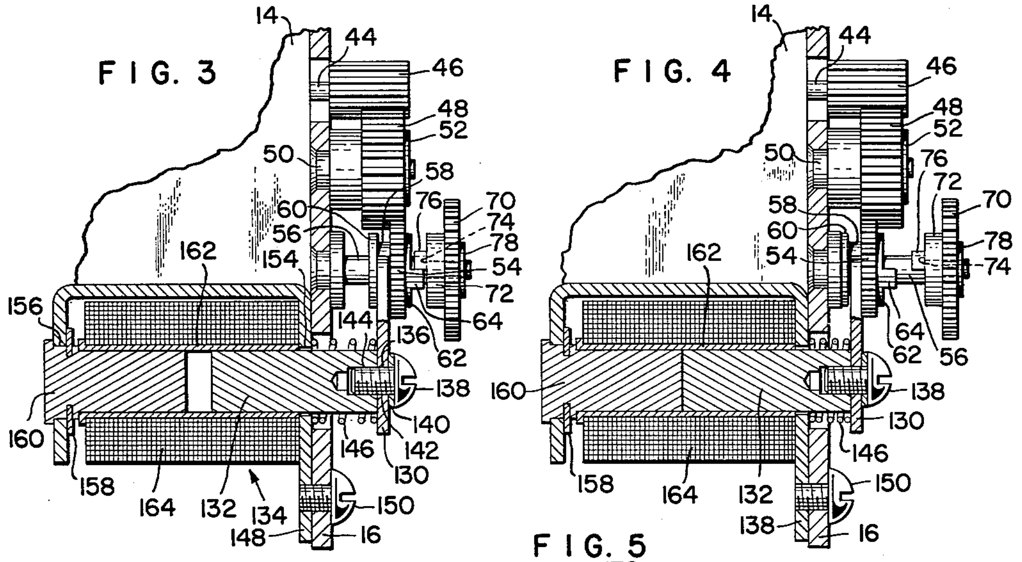
FIGURE 3 is a cross-sectional elevational view taken along the lines 3—3 of FIGURE 2 at a time when a solenoid of the aforementioned motion transmitting apparatus is in a deenergized position to permit a clutch to be engaged and motion to be transmitted between a synchronous motor and a counter driving gear.
FIGURE 4 is a cross-sectional elevational view taken along lines 3—3 of FIGURE 2 at a time when the aforementioned solenoid is in an energized position to permit the clutch to be disengaged so that rotary motion can be cut off between the aforementioned synchronous motor and counter driving gear.
Figure 5:
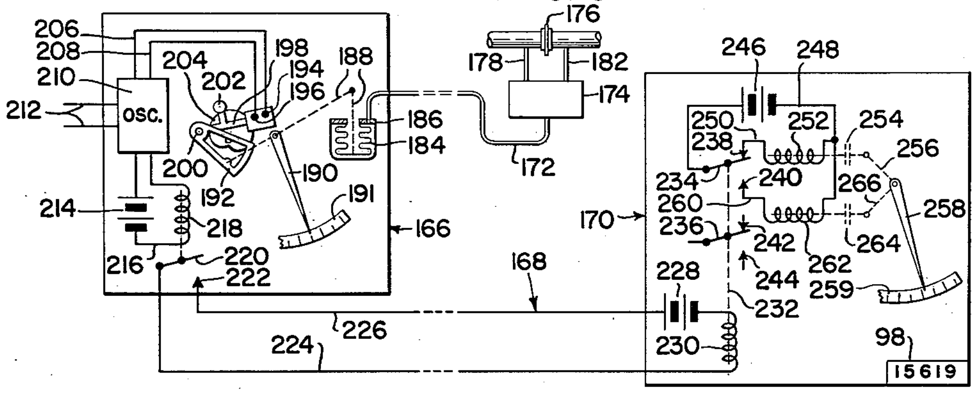
FIGURE 5 shows a schematic arrangement of the switches used in the aforementioned pulse duration during telemetering system which enables an operator to send or cut off a pulse being transmitted from a telemeter transmitter through a telemeter channel and thence to a solenoid relay actuator to cut in or cut out an electrical power supply with a telemeter receiver and counter connected therewith.
Figure 6:
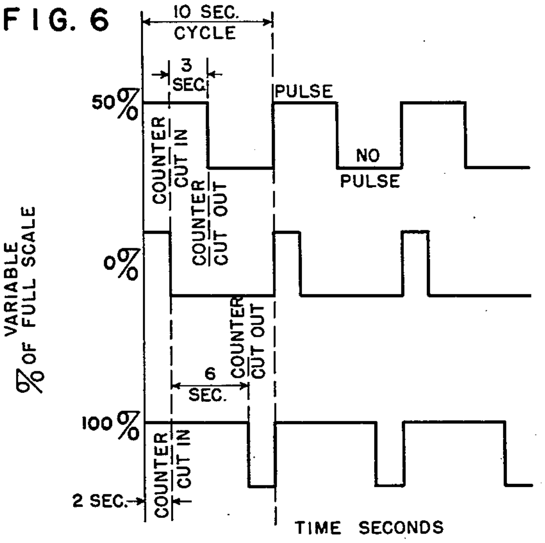
Figure 7:
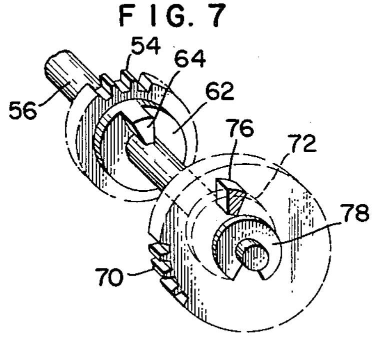
Figure 8:
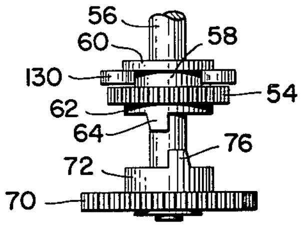
Figure 8A:
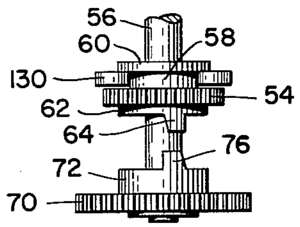
Figure 8B:
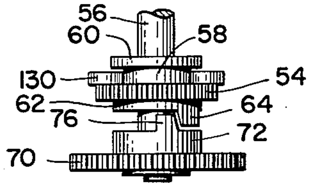
Figure 8C:
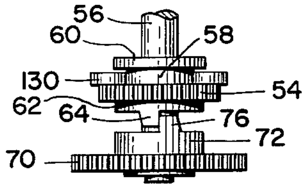
Figure 9:
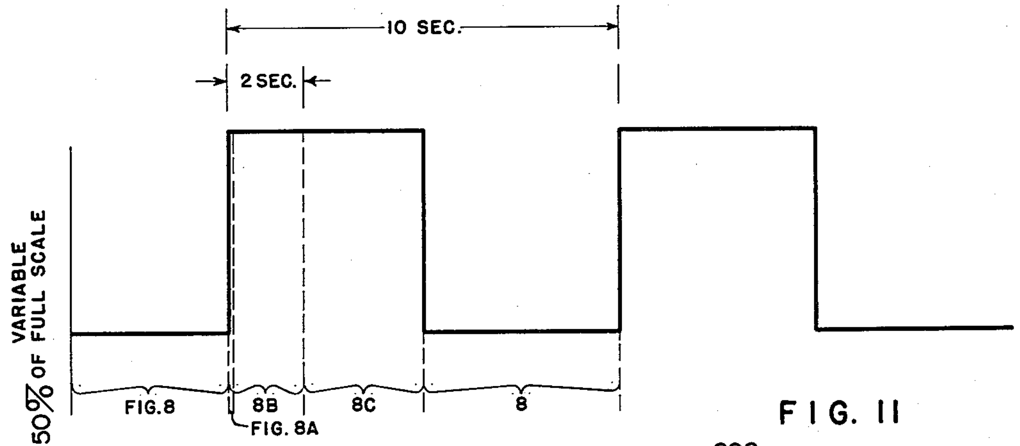
Figure 10:
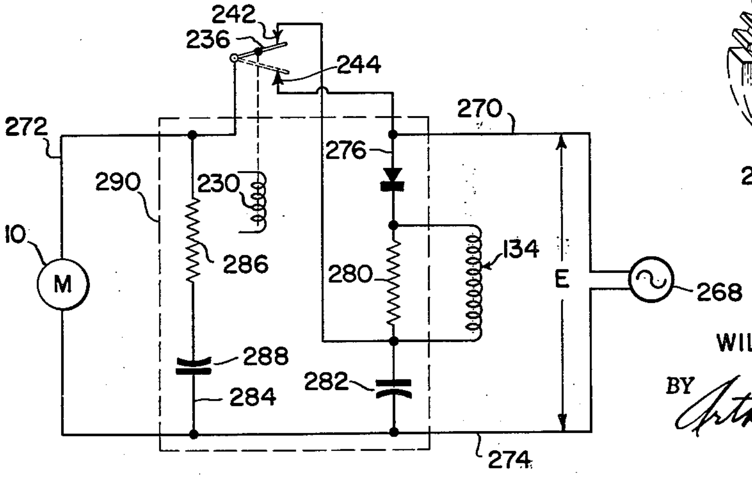
Figure 11:
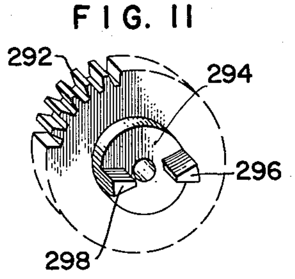

FIGURE 6 discloses how the switch arrangement of FIGURE 5 will enable the improved time delay apparatus disclosed in FIGURES 1–3 to clutch in the motion being transmitted by the previously referred to synchronous motor with the counter driving gear after a fixed interval of time and to thereafter declutch the driving gear from the motor drive after a period of pulse time has elapsed which will depend on the magnitude of the measured variable that is being measured by a primary element at the telemeter transmitter;

FIGURE 7 shows an energized, isometric view of the clutch gear that is driven by the synchronous clock motor and the detent on the integrator driving gear shown in FIGURES 1 and 2 of the drawing;

FIGURE 8 shows the position that the detents of the gears shown in FIGURE 7 will be in during an off-pulse condition;

FIGURE 8A shows the position that the detent of the gear shown in FIGURE 7 will be in at the time a pulse is initiated and the initial rotary motion of the synchronous clock motor has started its associated gear to rotate while deenergization of the solenoid is simultaneously taking place and the integrator driving gear is initially moved from its unclutch position as shown in FIGURE 4 toward the clutch position shown in FIGURE 3;

FIGURE 8B is similar to FIGURE 8A except that FIGURE 8B represents the out-of-contact condition existing between the synchronous clock-driven clutch gear and the integrator driving gear after the solenoid has been completely deenergized;

FIGURE 8C shows the clutched position that the detent of the clock-driven and the integrator driving gears will be in after the clock-driven gear has been rotated one revolution and the position it remains in during the length of time in which an on-pulse condition exists;

FIGURE 9 discloses an enlarged view of the top pulse diagrams shown in FIGURE 6 indicating at what points in the pulse-on, pulse-off cycle shown, the synchronous clock-driven gear and integrator driving gear will be in their respective positions as shown in FIGURES 8, 8A, 8B, and 8C;

FIGURE 10 shows a circuit diagram of how the opening and closing of the solenoid relay actuator is arranged to energize and deenergize the synchronous motor in order to drive its associated driving gear while it causes a solenoid to be moved between its deenergized and energized position as shown in FIGURES 3 and 4;

FIGURE 11 shows a modified form of the integrator driving gear shown in FIGURE 7.

Unless otherwise noted, corresponding components shown in the various figures carry corresponding reference characters.

FIGURE 1 of the drawing shows a two-coil synchronous electric clock motor 10 comprising conventional parts such as the coil 12 and the motor gear barrel 14 shown mounted on a bracket 16 which in turn is fixedly attached such as by welding material to a stationary member 18. The bracket 16 is provided with screws 20, 22 to retain the internally threaded sleeves 24, 26 in fixed relationship therewith. The parts of the motor are shown supported by means of screw 28 which passes through the support sleeve 30, 32 and which is threadedly mounted on internal threads, not shown, which are on the interior of sleeve 24.

Support for the aforementioned motor parts on the bracket is also provided by the screw 34 which passes through the sleeve 36, 38 and which is threadedly mounted on internal threads, not shown, which are on the interior of sleeve 26. Retained by the heads of screws 28 and 34 against their respective sleeves 30, 36 there is shown a spring plate 40 whose central curved portion 42 is retained in pressing engagement with the upper end of the motor gear barrel 14.

The synchronous motor is provided with a shaft 44 on which there is mounted a motor pinion 46. Motor drive pinion 46 is in turn in mesh with gear 48 that is rotatably mounted on a stationary shaft 50 and restricted from longitudinal movement thereon by means of a cotter 52. This gear 48 in turn is shown in FIGURES 1, 2, and 3 in driving engagement with the synchronous clock driven clutch gear 54 that is also rotatably mounted for longitudinal movement on a stationary shaft 56. FIGURE 3 shows a boss 58 having a flanged portion 60 integral with the rear surface of the clutch gear 54 and projecting therefrom. The front faced portion of the driving gear 54 is shown having an integral embossed portion 62 projecting therefrom and having a first clutch detent 64 which is substantially in the form of a trapezoid as can best be seen in detail in FIGURE 7 of the drawing.

The outer end of the shaft 56 has an integrator driving clutch gear 70 rotatably mounted thereon having an integral embossed portion 72 which is prevented from moving in an inward direction on the shaft by the shoulder 74 formed thereon. The embossed portion 72 is shown having a second clutch detent 76 which is of the same shape as the previously mentioned detent 64. The outer end of the integrator driving clutch gear 70 is prevented from outward movement on the shaft 56 by cotter 78.

The integrator driving clutch gear 70 is shown in FIGURES 1 and 2 of the drawing in driving engagement with gear 80 which together with gears 82, 84, 86, 88, 90, 92 and 94 form a gear train through which the number wheel 96 is rotated and a visible digital count, not shown, is registered on the counter 98. The counter 98 is in turn fixedly connected by means of screws 100, 102 to a support member 104 which is fixedly attached to the bracket 16 by suitable connection such as the screw 106.

Shafts 108, 110, 112 and 114 which carry their associated rotatable gears 80, 82, 84 and 96 are fixedly mounted at their inner end to bracket 16. The shafts 108, 110 and 112 are also provided with associated cotters 116, 118 and 120 at their outer ends and the diameter of the inner portion of their shafts in contact with the rear face of each of these gears is made larger than their outer ends to prevent the gears of the gear train from being misaligned with one another.

The gears 86 and 88 fixedly connected by sleeve 122 are arranged to rotate on a shaft 124 which is fixedly connected to the upper end of link 126. The other end of this link is threadedly mounted by means of the screw 128 to the shaft 114.

Positioned between the gears 54 and the flange portion 60 of boss 58 there is shown in FIGURES 1–4 a forked end of link 130. The opposite end of link 130 is shown attached to a longitudinal movable core plunger 132 of a solenoid 134. This latter-mentioned end of member 130 has an aperture 136 for accommodating the passage of a screw member 138 that has its under head surface in engagement with the washer 140. The threaded portion 142 of this screw member is shown in threaded engagement with the internal threads 144 formed in the center of the movable core plunger 132.

As can best be seen in FIGURES 3 and 4 of the drawing a coil spring 146 surrounds the outer right end of the movable core plunger 132 and has its right end in engagement with the lower end of the forked member 130. The left end of the coil spring 146 engages a U-shaped mounting plate 148 which is, best seen in FIGURES 2–4, fixedly attached by means of screws 150, 152 to the bracket 16. The right end of the mounting plate 148 is shown having an aperture 154 therein which is of a larger diameter than the movable coil plunger 132 so as to provide non-contacting movement of this plunger therethrough. The left end of the moving plate 148 is also shown having an aperture 156 therein which is of the same diameter as the plunger 132. In FIGURES 3 and 4 there is also shown projecting inwardly of this mounting plate 148 and fixedly retained by cotter 158 for longitudinal movement thereon a fixed core member 160 of the solenoid 134.

The inner ends of both the movable coil plunger 132 and the fixed core member 160 are shown in the deenergized condition of FIGURE 3 and in spaced apart relation with one another within the coil casing 162. Wrapped on the outer peripheral portion of the coil casing 162 is the coil 164. FIGURE 4 shows how the energization of this coil will cause the movable coil plunger 132 to be moved from its spaced apart position with respect to the right end of the fixed core member 160, as shown in FIGURE 3, into surface-to-surface contact therewith. It can also be seen in the comparison of FIGURE 3 showing with that of FIGURE 4 that when energization of the solenoid coil takes place the forked end of the member 130 along with the synchronous clock driving clutch gear 54 and its associated detent 64 will be caused to move out of its clutched engagement with the clutch detent 76 of the integrator driving clutch gear 70. It can further be seen that when the coil 164 is changed from the non-energized condition shown in FIGURE 3 to the energized condition as shown in FIGURE 4 that the motion of the fork member 130 carried by the movable core member 132 will cause the coil spring 146 to be compressed. Likewise if thereafter the coil 164 is again deenergized the coil spring 146 will be allowed to apply its spring force to the fork member 130 to move it into engagement with a stationary stop member 165 as shown in FIGURES 1 and 2. This latter action will allow the synchronous clock-driven clutch gear detent 64 to be brought into driving engagement with the detent 76 on the integrator driving clutch gear 70.

In order to have a clear understanding of the usefulness of the time delay mechanism disclosed herein a brief description will hereinafter be disclosed of the pulse duration type telemetering system in which such a mechanism can be advantageously employed. Such a telemetering system which is disclosed in FIGURE 5 of the drawing is comprised of a telemeter transmitter 166, a telemeter channel 168 and a telemeter receiver 170.

The telemeter transmitter 166 receives a pressure signal which is to be integrated by way of the conduit 172. The other end of this conduit 172 may be for example connected to a differential pressure measuring apparatus 174 that in turn measures the drop in pressure occurring across an orifice 176 in a flow line 178 by means of the conduits 178, 182 and then transmits a pressure proportional to this drop through conduit 172. This pressure is applied to the external surface of the bellows 184 within casing 186 to move the mechanical link 188 along with the indicator arm 190, in contact with the scale 191 and vane 192 connected therewith in a manner similar to that disclosed in the McGhee Patent 2,683,564.

FIGURE 5 also disclosed a pair of inductance coils 194, 196 pivoted on a roller support arm 198 and a pivot 200 about which the vane 192 rotates. The roller support arm 198 carries a roller 202 which is shown in rolling contact with the outer surface of a rotatable integrating cam member 204 the integrating function of which is explained in detail in the aforementioned McGhee patent.

A pair of conductors 206, 208 connect the inductance coils 194, 196 by way of oscillator 210 with an A.C. power source 212 connected therewith. A D.C. source 214 is also shown supplying a current from a rectifier, not shown, to the conductor 216 connected to a coil of relay 218 which is shown retaining the switch contact portion 220 out of contact with switch contact 222.

The electrical transmitting conductors 224, 226 forming component parts of the aforementioned telemetering channel 168 are shown having their left ends connected to this relay 218. Within a loop formed by these conductors 224, 226 there is shown another D.C. source 228 and a detector relay 230.

This detector relay 230 in turn is shown having a mechanical link 232 operably connected to move switch contact portions 234 and 236 into and out of contact with their respective contacts 238, 240 and 242, 244. When the contact 238 of the upper switch contact portion 234 is closed the current from D.C. source 246 will be enabled to flow by way of conductors 248, 250 to energize the solenoid 252. This action causes the friction disc clutch 254 to be moved to its closed position and the mechanical linkage 256 to be actuated in a direction that will cause the indicator 258 to be moved in a down scale direction along the scale 259 upon the occurrence of an increase in the magnitude of the variable being indicated. When the coil of the detector relay 230 is deenergized and the mechanical link 232 has caused the contact 234 to be moved to a position in which it is brought into contact with switch contact portion 240 then the current will flow from D.C. source 246 through conductors 248 and 260 to energize solenoid 262. This action causes the friction disc clutch 264 to be moved to a closed position and the mechanical linkage 266 to be moved so that the indicator 258 may then be driven in an up scale direction along the chart 259 upon the occurrence of a decrease in the magnitude of the variable being indicated.

FIGURE 6 of the drawing reveals a diagram to illustrate the pulse, no pulse characteristic which takes place when the magnitude of the variable being measured by the aforementioned ten second cycle pulse duration telemetering system is at zero, fifty, and one hundred percent full scale value. In each of these three illustrations it can be seen that a two second lapse of time of this cycle will initially take place between the time the closing of switch 220, 222 causes the detector relay 230 in the transmission channel 168 to be energized to close switch parts 236, 242 to drive the synchronous motor 10 and the time this motor can transmit its rotary motion by way of the previously mentioned detents 64, 67 on the clutch gear 54, 70 to the integrator 98. When the magnitude of the variable being transmitted is at zero percent full scale as shown in the second illustration of FIGURE 6 then it can be seen that the remaining eight seconds of the ten second cycle will be such that the switch parts 220, 222 will be disengaged and a no pulse transmitting condition created during this remaining eight second period.

When the magnitude of the variable being transmitted is at fifty percent of full scale as shown in the first illustration of FIGURE 6 it can be seen that during the next three seconds of this ten second cycle which follows the initial two second previously referred to part of the cycle, the switch parts 220, 222 will remain engaged and current will be transmitted through telemetering channel 168 to energize detector relay 230 in order to close contacts 236, 244 and to enable the synchronous motor 10 to be energized and solenoid 134 to be deenergized. The detents 64, 76 of clutch gears 54, 70 will then be brought into driving engagement to cause a continuous digital count to be registered on the counter 98. It can also be seen from observing FIGURE 6 that during the remaining five second period of this ten second cycle the switch parts 220, 222 will be disengaged and a no pulse transmitting condition created during this remaining five second period.

When the magnitude of the variable being transmitted is at one hundred percent of full scale as shown in the lowermost illustration shown in FIGURE 6 then it can be seen that during the next six seconds of this cycle, which follows the initial two seconds previously referred to, the switch parts 220, 222 will remain engaged and the detents 64, 76 of clutch gears 54, 70 will be brought into driving engagement to cause a continuous count to be registered on the digital counter. It can also be seen from observing FIGURE 6 that during the remaining two second period of this ten second cycle that the switch parts 220, 222 will be disengaged and a no pulse transmitting condition created during this remaining two second period.

FIGURE 7 shows a view similar to, but more detailed than shown in FIGURE 3. This FIGURE 7 clearly illustrates how the detent 64 on the synchronous motor driven clutch gear 54 is initially spaced apart from the detent 76 on the integrating driving clutch gear 70 so that the clutch gear 54 will be required to make one revolution before it can become engaged with clutch gear 70 and thereby drive the counter 98. The manner in which these detents 62, 76 miss each other during the initial three hundred and sixty degrees of rotation of the synchronous motor driven clutch gear 54 in going from the non-integrator driving position shown in FIGURE 4 to the integrator driving position shown in FIGURE 3 can best be seen by observing the sequential positions of these detents as shown in FIGURES 8, 8A, 8B, and 8C.

FIGURE 8 shows the position that the detents of the clutch gears 54 and 70 will be in during an off pulse condition as shown for example in FIGURE 9.

FIGURE 8A is a condition in which the synchronous motor 10 has been energized and its gear train 46, 48 has just begun to rotate the clutch gear 54 and its associated detent 62 slightly past the detent 74 of integrating driving clutch gear 70 while it is still in spaced relationship therewith.

FIGURE 8B is a condition in which the synchronous motor 10 is still energized and its gear train 46, 48 has rotated the clutch gear 54 and detent 64 clockwise and clear of its detent 74 after the solenoid 134 has been deenergized and the force of spring 146 has moved the solenoid core 132 forked link 130 and the detent 64 of gear 54 toward embossed portion 72.

FIGURE 8C is a condition in which the synchronous motor is still energized and its gear train 46, 48 has now rotated clutch gear 54 and detent 62 three hundred and sixty degrees during the aforementioned two second time delay period. When this FIGURE 8C position is reached the detents 62, 74 are in a clutched position which will enable any further rotation of the synchronous motor to be transmitted to the counter 98.

FIGURE 9 discloses a pulse-no pulse diagram similar to that shown for the fifty percent of full scale diagram in FIGURE 6 of the drawing. In addition to this, FIGURE 9 also identifies the period in the ten second cycle at which the detents 62, 74 will be in the position shown in FIGURES 8, 8A, 8B, and 8C.

FIGURE 10 shows an electrical circuit for energizing and deenergizing the solenoid 134 which is shown in detail in FIGURES 3 and 4. This same circuit also contains a brake mechanism 290 for causing the synchronous motor 10 that is also shown in FIGURE 3 to be rotated during a pulse telemetering condition or to be prevented from rotating during a non-pulse telemetering condition.

To accomplish this feat there is shown a power source 268. Conductors 270, 272 and 274 are shown connecting this power source to synchronous motor 10 when the contact 244, 236 are in the dotted line position as shown in the drawing. This will permit a 120 volt drop E to be applied directly across the motor and thereby cause motor shaft rotation to occur.

While this same voltage is being applied by way of conductors 276, diode 278, resistor 280, solenoid 134 and a capacitor 282. Another conductor 284 is shown in this circuit having a resistor 286 and a capacitor 288 which capacitor has a very low microfarad value as compared with the microfarad value of capacitor 282. The purpose of this resistor capacitor 286, 288 in this branch of the circuit is to act as an electric arc suppressing means.

Under the condition in which contacts 244, 236 are closed the synchronous motor 10 will be free to rotate and the solenoid 134 will be deenergized as shown in FIGURE 3.

When operating under a condition in which the contacts 242, 236 are closed it can be seen that the portion of the circuit shown in FIGURE 10 within the dotted line block 290 will permit current flowing from the D.C. source 266 to pass through the electrical components within the block in such a manner as to act as a brake on the synchronous motor 10 and to thus cause the rotation of the motor 10 to stop while the solenoid is permitted to be energized to the position shown in FIGURE 4.

FIGURE 11 shows a modified form of the integrator driving clutch gear 292 having an embossed portion 294 and two detents 296, 298 which may be substituted for the single detent integrator driving clutch gear 54 and its embossed and detent portions 62, 64 shown in FIGURE 7 of the drawing. Such a two detent clutch gear 292 can be advantageously employed in a pulse duration telemetering system having a five second pulse on, pulse off cycle in lieu of the ten second pulse on, pulse off cycle arrangement already described supra. It can therefore be seen that with this FIGURE 11 arrangement either the detent 296 or 298 will be brought in driving engagement with detent 76 shown in FIGURE 7 after one second of time has elapsed during this five second pulse on cycle as compared with the two second period of time required before engagement can take place between the detents 64 and 72 when the clutch gear arrangement shown in FIGURE 7 is employed. This is because the single detent 64 on the synchronous motor driven gear 54 will be required to make a complete revolution before it is engaged with the single detent 76 on the integrator driving gear when a ten second pulse on, pulse off cycle is employed. However, when the single detent on the synchronous motor driven gear 292 is used with the integrator driving gear 70 the two equally spaced apart detents 296, 298 of this synchronous motor driven gear 292 it will only be necessary to make a half a revolution before engagement takes place between one or the other of the detents 296, 298 and the detent 76.

It should be further understood that the aforementioned one or two second initial time delay required before the counter 98 is driven can be altered by varying the gear ratio that exists between gear 46 and 54 and/or by varying the speed of the synchronous motor 10.

From the aforementioned description it can be seen that a spring actuated inertia introducing time delay solenoid mechanism has been disclosed which will after a fixed period of time clutch in an idling clutch gear being driven by a synchronous motor with a second clutch gear mounted on a stub shaft so that the motion of the synchronous motor being transmitted to this second gear may be used to drive a counter.

What is claimed is:

1. A time delay apparatus for use in a gear train transmitting power from a driving shaft to a driven shaft, said time delay apparatus comprising a stub shaft fixedly positioned to support two freely rotatable clutch gears of said gear train thereon, each of said clutch gears having a detent protruding therefrom on faces that are immediately adjacent one another, a first of said clutch gears being operably connected to rotate only on an outer end portion of said stub shaft and the other of said gears being operably connected to slide along said stub shaft, an intermittently energized solenoid, a forked lever fixedly connected at one of its end to a movable core of said solenoid and at its other end to an embossed portion on another face of said other of said gears, a spring operably positioned to apply a force to said forked lever to cause said detent of said other gear to be brought into driving engagement with said detent of said other mentioned clutch gear only after said driving shaft has rotated said other driving gear through one complete revolution and said solenoid is deenergized to thereby effect a constant time delay before said power can be transmitted between said driving and driven shafts through said gear train.

2. A time delay apparatus for use in a gear train transmitting power from a driving shaft to a driven shaft, said time delay apparatus comprising a stub shaft fixedly positioned to support two freely rotatable clutch gears of said gear train thereon, a first one of said clutch gears having a single detent protruding therefrom and the other clutch gear having two spaced apart detents protruding therefrom on faces that are immediately adjacent one another, said first of said clutch gears being operably connected to rotate only on an outer end portion of said stub shaft and the other of said gears being operably connected to slide along said stub shaft, an intermittently energized solenoid, a forked lever fixedly connected at one of its ends to a movable core of said solenoid and at its other end to an embossed portion on another face of said other of said gears, a spring operably positioned to apply a force to said fork members to cause said detent of said first one of said gears to be brought into driving engagement with one of said detents of said other mentioned clutch gear only after said solenoid has been deenergized and said driving shaft has rotated said other driving gear through one half a revolution to thereby effect a constant time delay before said power can be transmitted between said driving and driven shaft through said gear train.

3. A time delay apparatus for use in a gear train transmitting power from a driving shaft to a driven shaft, said time delay apparatus comprising a stub shaft fixedly positioned to support two freely rotatable clutch gears of said gear train thereon, a first one of said clutch gears having a single detent protruding therefrom and the other clutch gear having two spaced apart detents protruding therefrom on faces that are immediately adjacent one another, said first of said clutch gears being operably connected to rotate only on an outer end portion of said stub shaft and the other of said gears being operably connected to slide along said stub shaft, an intermittenly energized solenoid, a forked lever fixedly connected at one of its ends to a movable core of said solenoid and at its other end to an embossed portion on another face of said other of said gears, a spring operably positioned to apply a force to said fork member to cause said detents of said first of said gears to be brought into driving engagement with one of said detents of said other mentioned clutch gear only after said solenoid has been deenergized and said driving shaft has rotated said other driving gear through a selected portion of a revolution to thereby effect a constant time delay before said power can be transmitted between said driving and driven shaft through said gear train.

4. The time delay apparatus as defined in claim 1 wherein said other of said clutch gears is continuously rotated by a third gear of said train that is being driven by said driving shaft when said solenoid is deenergized and said spring is applying its spring force to said forked member.

5. The time delay apparatus as defined in claim 1 wherein said spring is operably positioned on the periphery of one end of said movable core of said solenoid and between a stationary member and said forked lever and wherein placing of said solenoid in an energized condition will cause said solenoid core to be moved inwardly of its stationary coil and the spring to be simultaneously compressed by said lever against said stationary member.

6. The time delay apparatus as defined in claim 1 in which one end of said driving shaft is operably connected in driven relationship with a synchronous electric motor and wherein an electric switching circuit is employed to simultaneously deenergize said solenoid and start rotation of said motor and said driving shaft.

7. The time delay apparatus as defined in claim 1 in which one end of said driving shaft is operably connected in driven relationship with a synchronous electric motor and wherein an electric switching circuit is employed to simultaneously energize said solenoid and stop rotation of said motor and said driving shaft.

8. The time delay apparatus as defined in claim 1 in which one end of said driving shaft is operably connected in driven relationship with a synchronous motor and wherein an electric switching circuit is employed to simultaneously energize said solenoid and deenergize said motor and to thereby cut out the rotation of said motor being transmitted to said driving shaft whenever a solenoid actuated detector relay forming a part of said switching circuit is moved to one of two switch contact positions.

9. The time delay apparatus as defined in claim 1 in which one end of said driving shaft is operably connected in driven relationship with a synchronous motor and wherein an electric switching circuit is employed to simultaneously deenergize said solenoid and energize said motor and to thereby cause rotation of said motor to be transmitted to said drive shaft whenever a solenoid actuated detector relay in said switching circuit is moved to a second of a two switch contact position, a transmitter operably connected to said solenoid operated detector relay by means of a telemeter channel to retain said detector relay in said second contact position for varying intermittent lengths of time in which said transmitter is operably connected to transmit a solenoid energizing signal through said channel to energize said detector relay.

10. The time delay apparatus as defined in claim 1 in which said driving shaft is operably connected in driven relationship with a synchronous motor and wherein an electric switching circuit is employed to simultaneously deenergize said solenoid and energize said motor and to cut in the rotation of said motor being transmitted to said driving shaft whenever another solenoid actuated detector relay in said switching circuit is closed by a pulse duration solenoid energizing signal passing therethrough and wherein said electric switching circuit is further operably connected to energize said solenoid and deenergize said motor whenever said pulse duration signal is cut off and said solenoid actuated detector relay in said switching circuit is thereby caused to open.

11. A time delay apparatus for use in a gear train of a preselected speed ratio transmitting power from a driving shaft to a driven shaft, said time delay apparatus comprising a stub shaft fixedly positioned to support two freely rotatable clutch gears of said gear train thereon, each of said clutch gears having a detent protruding therefrom on faces that are immediately adjacent one another, a first of said clutch gears being operably connected to rotate only on an outer end portion of said stub shaft and the other of said gears being operably connected to slide along said stub shaft, an intermittenly energized solenoid, a forked lever fixedly connected at one of its ends to a movable core of said solenoid and at its other end to an embossed portion on another face of said other of said gears, a spring operably positioned to apply a force to said forked lever to cause said detent of said other gear to be brought into driving engagement with said detent of said other mentioned clutch gear only after said driving shaft has rotated said other driving gear through one complete revolution and said solenoid is deenergized to thereby effect a constant time delay before said power can be transmitted between said driving and driven shafts through said gear train.

12. A time delay apparatus for use in a gear train of a preselected speed ratio transmitting power from a driving shaft to a driven shaft, said time delay apparatus comprising a stub shaft fixedly positioned to support two freely rotatable clutch gears of said gear train thereon, a first one of said clutch gears having a single detent protruding therefrom and the other clutch gear having two spaced apart detents protruding therefrom on faces that are immediately adjacent one another, said first of said clutch gears being operably connected to rotate only on an outer end portion of said stub shaft and the other of said gears being operably connected to slide along said stub shaft, an intermittently energized solenoid, a forked lever fixedly connected at one of its ends to a movable core of said solenoid and at its other end to an embossed portion on another face of said other of said gears, a spring operably positioned to apply a force to said fork members to cause said detent of said first one of said gears to be brought into driving engagement with one of said detents of said other mentioned clutch gear only after said solenoid has been deenergized and said driving shaft has rotated said other driving gear through one half a revolution to thereby effect a constant time delay before said power can be transmitted between said driving and driven shaft through said gear train.

13. A time delay apparatus for use in a gear train of a preselected speed ratio transmitting power from a driving shaft to a driven shaft, said time delay apparatus comprising a stub shaft fixedly positioned to support two freely rotatable clutch gears of said gear train thereon, a first one of said clutch gears having a single detent protruding therefrom and the other clutch gear having two spaced apart detents protruding therefrom on faces that are immediately adjacent one another, said first of said clutch gears being operably connected to rotate only on an outer end portion of said stub shaft and the other of said gears being operably connected to slide along said stub shaft, an intermittently energized solenoid, a forked lever fixedly connected at one of its ends to a movable core of said solenoid and at its other end to an embossed portion on another face of said other of said gears, a spring operably positioned to apply a force to said fork member to cause said detents of said first of said gears to be brought into driving engagement with one of said detents of said other mentioned clutch gear only after said solenoid has been deenergized and said driving shaft has rotated said other driving gear through a selected portion of a revolution to thereby effect a constant time delay before said power can be transmitted between said driving and driven shaft through said gear train.

14. A time delay apparatus for use in a gear train transmitting power from a driving shaft to a driven shaft, said time delay apparatus comprising a stub shaft fixedly positioned to support two freely rotatable clutch gears of said gear train thereon, each of said clutch gears having a detent protruding therefrom on faces that are immediately adjacent one another, a first of said clutch gears being operably connected to rotate only on an outer end portion of said stub shaft and the second of said gears being operably connected to slide along said stub shaft, a gear driving means forming a portion of said gear train and being positioned between said driving shaft and the second freely rotatable clutch gear, said width of said driving means being of a greater dimension than the width of the gear portion of said second freely rotatable clutch gear, an intermittently energized solenoid, a forked lever fixedly connected at one of its ends to a movable core of said solenoid and at its other end to an embossed portion on another face of said other of said second clutch gear, a spring operably positioned to apply a force to said forked lever to cause said detent of said second clutch gear to be brought into driving engagement with said detent of said other mentioned clutch gear only after said gear driving means has rotated said second clutch gear through one complete revolution and said solenoid is deenergized to thereby effect a constant time delay before said power can be transmitted between said driving and driven shafts through said gear train.

(References on following page)

References Cited in the file of this patent

UNITED STATES PATENTS

| | | |
|---|---|---|
| 759,291 | Lippincott | May 10, 1904 |
| 1,542,400 | Ter Meer | June 16, 1925 |
| 1,742,147 | Renwick | Dec. 31, 1929 |
| 2,253,842 | Brotman | Aug. 26, 1941 |
| 2,307,264 | Hamlin | Jan. 5, 1943 |
| 2,683,564 | McGhee | July 13, 1954 |
| 2,746,318 | Benjamin | May 25, 1956 |
| 2,830,762 | Christensen | Apr. 5, 1958 |

FOREIGN PATENTS

| | | |
|---|---|---|
| 360,602 | Germany | Oct. 5, 1922 |
| 610,522 | France | June 12, 1926 |
| 656,921 | Great Britain | Sept. 5, 1951 |